(12) United States Patent
Wei

(10) Patent No.: US 10,742,854 B2
(45) Date of Patent: Aug. 11, 2020

(54) IMAGING CAMERA

(71) Applicant: AAC Technologies Pte. Ltd., Singapore (SG)

(72) Inventor: Chuandong Wei, Shenzhen (CN)

(73) Assignee: AAC Optics Solutions Pte. Ltd., Singapore (SG)

(*) Notice: Subject to any disclaimer, the term of this patent is extended or adjusted under 35 U.S.C. 154(b) by 0 days.

(21) Appl. No.: 16/236,328

(22) Filed: Dec. 28, 2018

(65) Prior Publication Data
US 2019/0238735 A1    Aug. 1, 2019

(30) Foreign Application Priority Data
Jan. 29, 2018 (CN) .................... 2018 2 0151217 U

(51) Int. Cl.
*H04N 5/225* (2006.01)
*G02B 7/02* (2006.01)

(52) U.S. Cl.
CPC ........... *H04N 5/22521* (2018.08); *G02B 7/02* (2013.01); *H04N 5/2254* (2013.01)

(58) Field of Classification Search
None
See application file for complete search history.

(56) References Cited

U.S. PATENT DOCUMENTS

| | | | |
|---|---|---|---|
| 8,866,949 B2* | 10/2014 | Yano ................ | B32B 37/12 348/294 |
| 2009/0160998 A1* | 6/2009 | Fukamachi ........... | G02B 7/021 348/340 |
| 2009/0279191 A1* | 11/2009 | Yu ........................ | G02B 7/022 359/819 |

* cited by examiner

*Primary Examiner* — James M Hannett
(74) *Attorney, Agent, or Firm* — IPro, PLLC; Na Xu

(57) ABSTRACT

The present application discloses an imaging camera, including in a sequence: a first lens, a shielding, and a second lens. The shielding includes a first part extending horizontally, and a second part obliquely extending from the first part toward an optical axis of the imaging camera, and a third part extending horizontally from the second part toward the optical axis. Each of the first and second lenses includes a plane abutting against the first part and another plane abutting against the third part.

6 Claims, 2 Drawing Sheets

IMAGING CAMERA

FIELD OF THE PRESENT DISCLOSURE

The present disclosure relates to the field of image capturing, and more particularly to an imaging camera for capturing an image.

DESCRIPTION OF RELATED ART

With development of technology, besides digital cameras, more and more portable electronic devices are equipped with image capturing functions. To achieve the image capturing function, a camera module is needed. Generally, a camera module includes a camera lens for collecting light reflected from an object, a sensor for receiving the light and converting the light to electrical signals, and processor for calculating the signals and outputting digital images.

A related imaging camera generally includes a lens holder and a plurality of lens units accommodated in the lens holder. For positioning the lens holder, the imaging camera further provides a housing for accommodating and fastening the lens holder.

Typically, an imaging camera includes a lens holder, at least two lens units accommodated in the lens holder, a pressing ring located between the lens unit adjacent to the lens holder and the lens holder, and a gasket located between the at least two lens units. The lens units are fixed to the lens holder by adhering the pressing ring to the lens holder. The gasket is used for adjusting the distance between the two at least lens units. The pressing ring is mainly used to fasten the components inside the lens holder, and is generally attached to the lens holder by glue.

However, incident light will be reflected by peripheral portions of the lens units, or by the shielding, and the reflected light is called stray light that is a factor affecting image quality.

Therefore, it is desired that an improved imaging camera can overcome the disadvantages mentioned above.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

Embodiment 1

Figure 1:
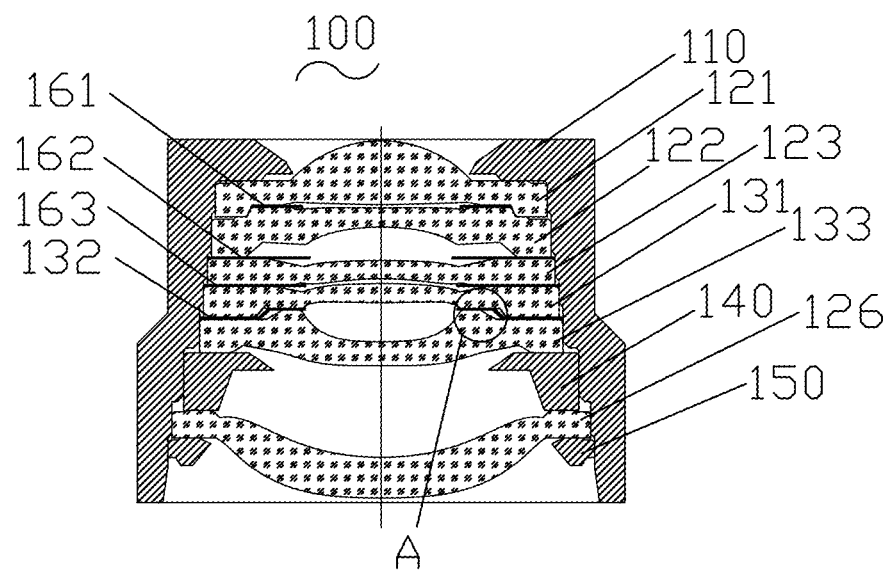
FIG. 1 is an illustration of an imaging camera in accordance with a first exemplary embodiment of the present invention.
Figure 2:
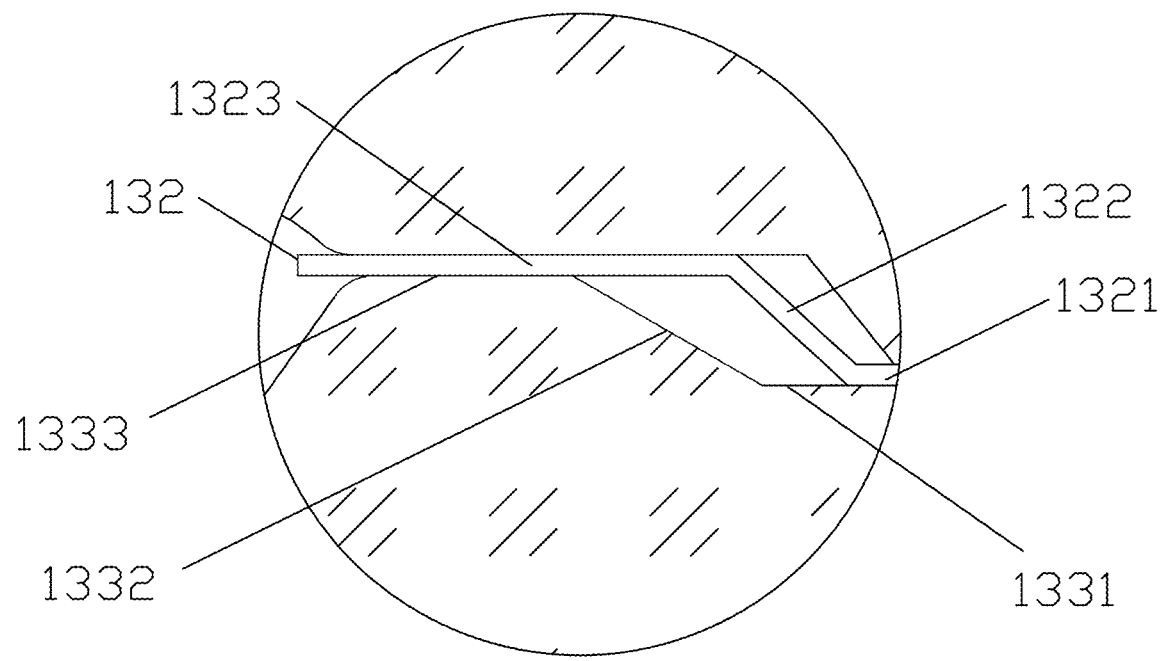
FIG. 2 is an enlarged view of Part A in FIG. 1.

Referring to FIGS. 1-2, an imaging camera 100 in accordance with a first exemplary embodiment of the present invention includes, in a sequence, a first lens 131, a shielding 132, and a second lens 133. The shielding 132 is a ring, and includes a first part 1321 extending horizontally, and a second part 1322 obliquely extending from the first part 1321 toward an optical axis of the imaging camera 100, and a third part 1323 extending horizontally from the second part 1322 toward the optical axis. The first and second lenses 131, 133 both include a plane abutting against the first part 1321 and another plane abutting against the third part 1323.

The second lens 133 includes a fourth plane 1331 abutting against the first part and a sixth plane 1333 abutting against the third part 1323. The first lens also includes planes to be engaged with the first and third parts.

The invention provides a configuration to thicken or thin edges of the lenses for cooperating with the shielding, which makes it more flexible to design the lenses, and makes it more effective to reduce the stray light reflected by the edges of the lenses.

Referring to FIG. 2, the second lens 133 locates at an image side of the shielding 132. A second surface of the second lens 133 adjacent to the shielding 132 includes a fourth plane 1331, a fifth plane 1332 and a sixth plane 133. The fourth plane 1331 abuts against the first part 1321, the sixth plane 1333 abuts against the third part 1323, and the fifth plane 1332 does not contact with the second part.

The first lens and the second lens cooperatively form a gap which is adjustable according to actual requirements. The fifth plane 1332 extends from the fourth plane 1331 obliquely toward the object side.

The first lens 131 locates on the object side of the shielding 132, and a first surface of the first lens adjacent to the shielding 132 includes a first surface, a second surface and a third surface. The first surface abuts against the first part, the third surface contacts with the third part, while the second surface does not contact with the second part. The second plane obliquely extends from the first plane toward the object side.

Referring back to FIG. 1, the imaging camera 100 includes a lens holder 110 and a lens group accommodated in the lens holder 110. The lens group includes, in an order from the object side to the image side, a third lens 121, a first shielding 161, a fourth lens 122, a second shielding 162, a fifth lens 123, a third shielding 163, a first lens 131, a shielding 132, a second lens 133, a blocking board 140, a sixth lens 126 and a pressing ring 150.

The amount of all the components mentioned above can be adjusted according to actual requirements.

The first lens 131 and the second lens 133 is positioned between the fifth lens and the sixth lens, however, the positions can be adjusted according to different requirement. The shielding and the blocking board can stop the stray light, and the pressing ring is used for fastening the components inside the lens holder.

Referring to FIG. 2, both sides of the third part adjacent to the optical axis are spaced from the first lens and the second lens. Also, both sides of the third part can contact the first and second lenses.

Compared with related arts, the shielding includes two horizontal parts extending in different directions, which can reduce the stray light reflected by the supporting parts of the lenses.

Embodiment 2

As an improvement, the second plane extends from the first plane toward the image side obliquely.

As an improvement, the fifth plane extends from the fourth plane toward the image side obliquely.

Figure 3:
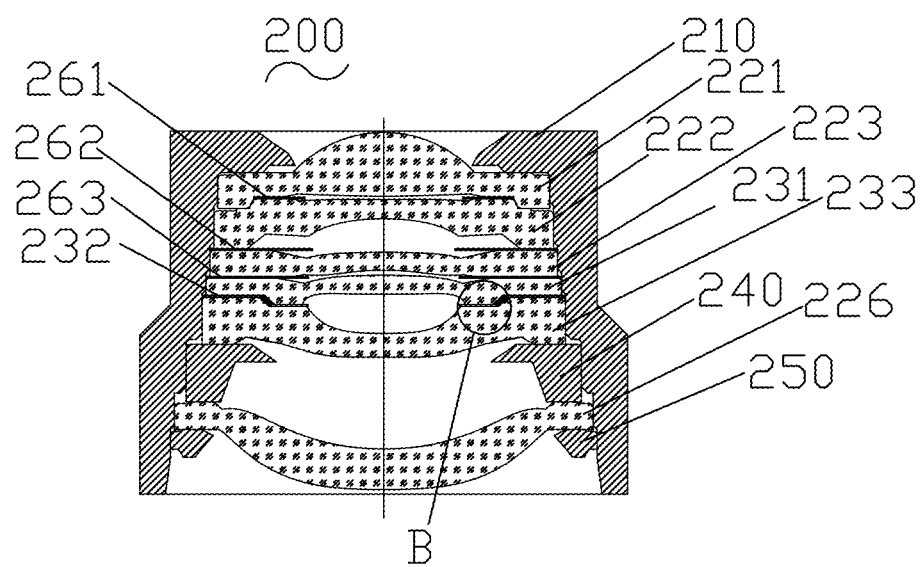
FIG. 3 is an illustration of an imaging camera in accordance with a second exemplary embodiment of the present invention.
Figure 4:
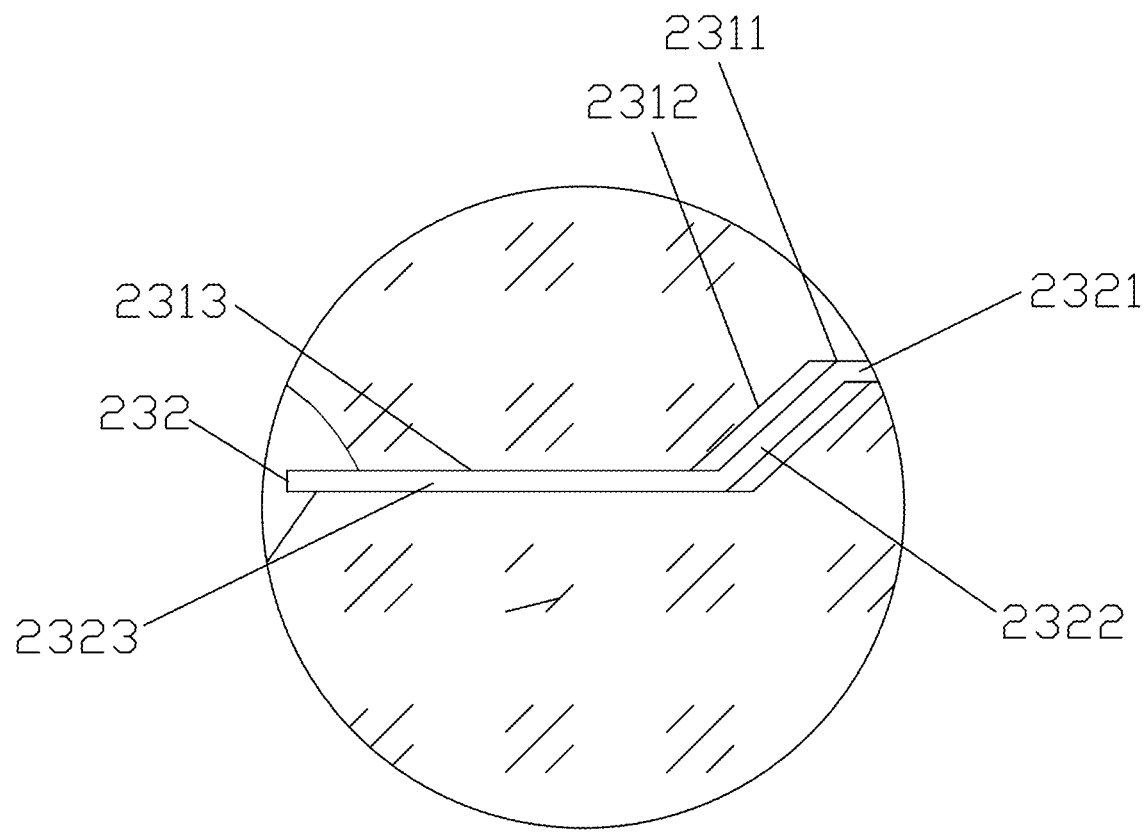
FIG. 4 is an enlarged view of Part B in FIG. 3.

Referring to FIGS. 3-4, the imaging camera 200 in accordance with a second exemplary embodiment of the present invention includes, in a sequence, a first lens 231, a shielding 232, and a second lens 233. The shielding 232 is a ring, and includes a first part 2321 extending horizontally, and a second part 2322 obliquely extending from the first part 2321 toward an optical axis of the imaging camera 300, and a third part 2323 extending horizontally from the second part 2322 toward the optical axis. The first and second lenses 231, 233 both include a plane abutting against the first part 2321 and another plane abutting against the third part 2323.

The first lens 231 includes a fourth plane 2311 abutting against the first part and a sixth plane 2313 abutting against the third part. The second lens also includes planes to be engaged with the first and third parts.

The invention provides a configuration to thicken or thin edges of the lenses for cooperating with the shielding, which makes it more flexible to design the lenses, and makes it more effective to reduce the stray light reflected by the edges of the lenses.

Referring to FIG. 4, the first lens 231 locates at an object side of the shielding. A first surface of the first lens adjacent to the shielding includes a first plane 2311, a second plane 2312 and a third plane 2313. The first plane 2311 abuts against the first part 2321, the third plane 2313 abuts against the third part 2323, and the second plane does not contact with the second part. The second plane 2312 extends from the first plane toward the object side.

The first lens 231 and the second lens 233 cooperatively form a gap which is adjustable according to actual requirements. The fifth plane 1332 extends from the fourth plane 1331 obliquely toward the object side.

The second lens 233 locates on the image side of the shielding, and a second surface of the second lens adjacent to the shielding includes a fourth surface, a fifth surface and a sixth surface. The fourth surface abuts against the first part 2321, the sixth surface contacts with the third part 2323, while the fifth surface does not contact with the second part.

Referring back to FIG. 3, the imaging camera 200 includes a lens holder 210 and a lens group accommodated in the lens holder 210. The lens group includes, in an order from the object side to the image side, a third lens 221, a first shielding 261, a fourth lens 222, a second shielding 262, a fifth lens 223, a third shielding 263, a first lens 231, a shielding 232, a second lens 233, a blocking board 240, a sixth lens 226 and a pressing ring 250.

The amount of all the components mentioned above can be adjusted according to actual requirements.

The first lens 231 and the second lens 233 is positioned between the fifth lens and the sixth lens, however, the positions can be adjusted according to different requirement. The shielding and the blocking board can stop the stray light, and the pressing ring is used for fastening the components inside the lens holder.

Referring to FIG. 3, both sides of the third part adjacent to the optical axis are spaced from the first lens and the second lens. Also, both sides of the third part can contact the first and second lenses.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. An imaging camera, including in a sequence: a first lens, a shielding, and a second lens; wherein the shielding includes a first part extending horizontally, and a second part obliquely extending from the first part toward an optical axis of the imaging camera, and a third part extending horizontally from the second part toward the optical axis; each of the first and second lenses includes a plane abutting against the first part and another plane abutting against the third part;

the first lens locates at an object side of the shielding, a first surface of the first lens adjacent to the shielding includes a first plane, a second plane and a third plane, the first plane abuts against the first part, the third plane abuts against the third part, and the second plane does not contact with the second part, the first plane extending horizontally, and the second plane obliquely extending from the first plane toward the optical axis, and the third plane extending horizontally from the second plane toward the optical axis.

2. The imaging camera as described in claim 1, wherein the second plane extends from the first plane toward the object side.

3. The imaging camera as described in claim 1, wherein the second plane extends from the first plane toward the image side.

4. The imaging camera as described in claim 1, wherein the second lens locates at an image side of the shielding; a second surface of the second lens adjacent to the shielding includes a fourth plane, a fifth plane and a sixth plane; the fourth plane abuts against the first part, the sixth plane abuts against the third part, and the fifth plane does not contact with the second part.

5. The imaging camera as described in claim 4, wherein the fifth plane extends from the fourth plane obliquely toward the object side.

6. The imaging camera as described in claim 4, wherein the fifth plane extends from the fourth plane obliquely toward the image side.

* * * * *